United States Patent
Shah

(10) Patent No.: US 10,109,161 B2
(45) Date of Patent: Oct. 23, 2018

(54) HAPTIC DRIVER WITH ATTENUATION

(71) Applicant: Immersion Corporation, San Jose, CA (US)

(72) Inventor: Kaniyalal Shah, Fremont, CA (US)

(73) Assignee: IMMERSION CORPORATION, San Jose, CA (US)

(*) Notice: Subject to any disclaimer, the term of this patent is extended or adjusted under 35 U.S.C. 154(b) by 4 days.

(21) Appl. No.: 15/240,682

(22) Filed: Aug. 18, 2016

(65) Prior Publication Data

US 2017/0053502 A1    Feb. 23, 2017

Related U.S. Application Data

(60) Provisional application No. 62/208,430, filed on Aug. 21, 2015.

(51) Int. Cl.
*G08B 6/00* (2006.01)

(52) U.S. Cl.
CPC ...................... *G08B 6/00* (2013.01)

(58) Field of Classification Search
None
See application file for complete search history.

(56) References Cited

U.S. PATENT DOCUMENTS

| | | |
|---|---|---|
| 4,479,098 A | 10/1984 | Watson |
| 4,539,845 A | 9/1985 | Molimar |
| 4,811,835 A | 3/1989 | Bullivant et al. |
| 5,436,622 A | 7/1995 | Gutman et al. |
| 5,682,132 A | 10/1997 | Hiroyoshi et al. |
| 5,783,973 A | 7/1998 | Weinberg et al. |
| 6,275,213 B1 | 8/2001 | Tremblay et al. |
| 6,424,333 B1 | 7/2002 | Tremblay et al. |
| 6,473,075 B1 | 10/2002 | Gomes et al. |
| 7,843,277 B2 * | 11/2010 | Gregorio et al. ............. 345/173 |
| 8,994,518 B2 | 3/2015 | Gregorio et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |

(Continued)

FOREIGN PATENT DOCUMENTS

| | | |
|---|---|---|
| WO | 99/63537 | 12/1999 |
| WO | 2014046705 A1 | 3/2014 |

*Primary Examiner* — Brent Swarthout
(74) *Attorney, Agent, or Firm* — Miles & Stockbridge P.C.

(57) ABSTRACT

In each of the various embodiments, a haptic driver is configured to attenuate a drive signal of an actuator. In particular, the haptic drivers described herein are configured to identify the resonance frequency of the actuator and to attenuate the haptic drive signal within a range of frequencies, the range being based on the identified resonance frequency. As a result, the strength of haptic effects produced by the actuator may be more uniform along a wider frequency range.

24 Claims, 9 Drawing Sheets

(56) References Cited

U.S. PATENT DOCUMENTS

| | | |
|---|---|---|
| 2002/0177419 A1 | 11/2002 | Hwang |
| 2004/0104625 A1 | 6/2004 | Wakuda et al. |
| 2004/0139803 A1 | 7/2004 | Robinson et al. |
| 2005/0052415 A1 | 3/2005 | Braun et al. |
| 2006/0119573 A1 | 6/2006 | Grant et al. |
| 2006/0290662 A1 | 12/2006 | Houston et al. |
| 2012/0232780 A1 | 9/2012 | Delson et al. |
| 2014/0132568 A1 | 5/2014 | Hirose et al. |
| 2014/0167941 A1* | 6/2014 | Rank .................. G08B 6/00 340/407.1 |
| 2014/0217945 A1* | 8/2014 | Cahill .................. G01H 13/00 318/490 |
| 2014/0368440 A1 | 12/2014 | Polyakov et al. |
| 2015/0220148 A1 | 8/2015 | Gregorio et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Bray et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0169674 A1* | 6/2017 | Macours .................. G08B 6/00 |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

\* cited by examiner

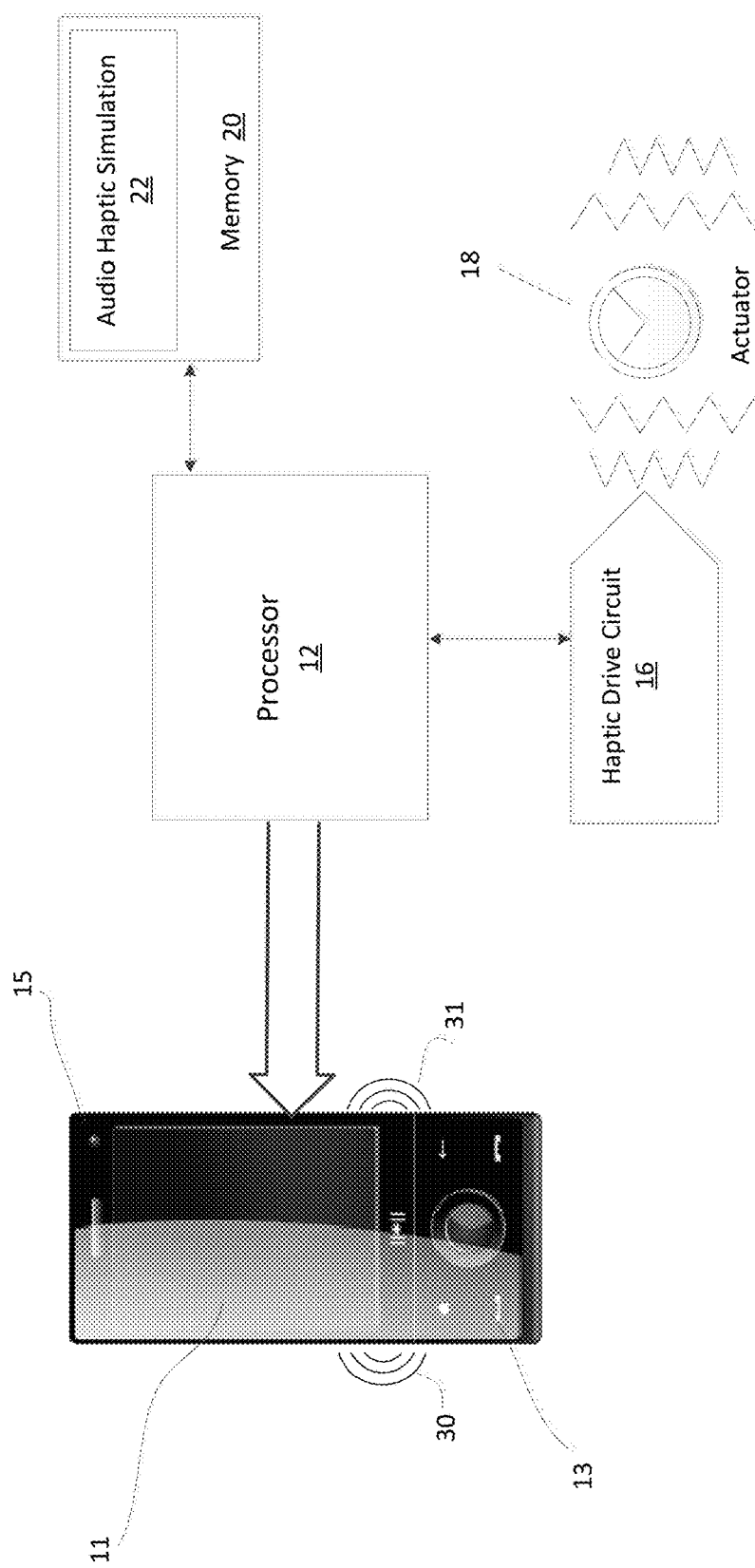

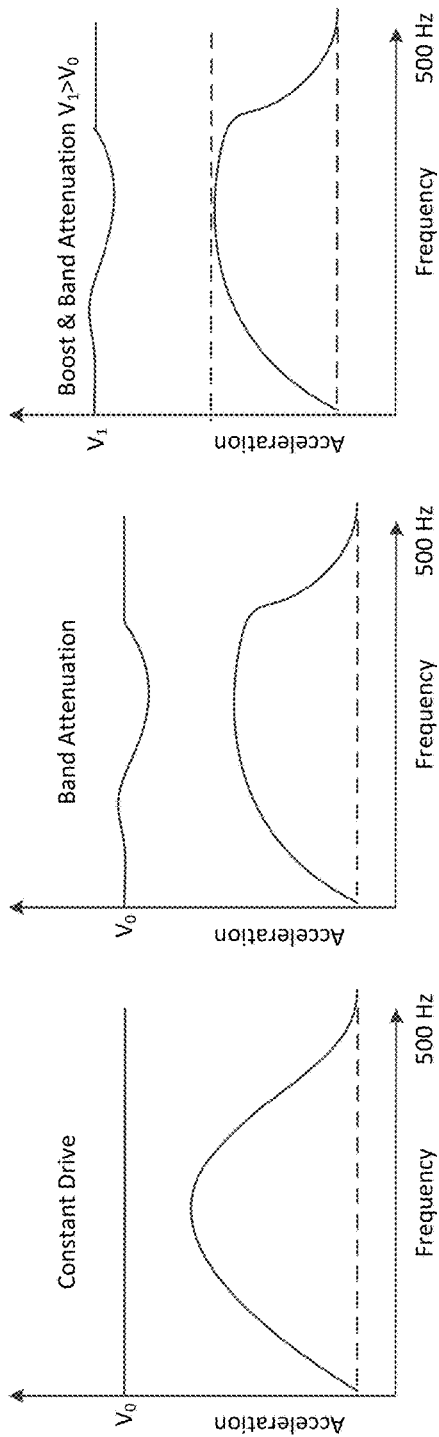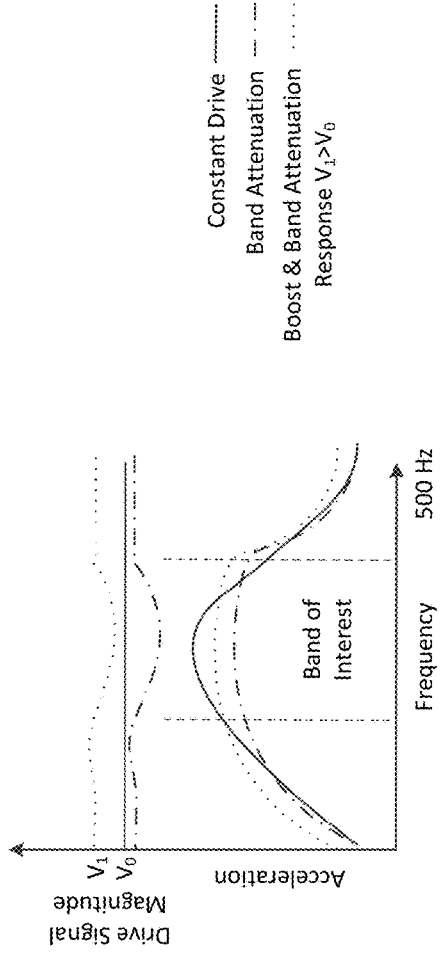

300

HAPTIC DRIVER WITH ATTENUATION

PRIORITY APPLICATION

This application claims the benefits of U.S. Provisional Patent Application No. 62/208,430, filed on Aug. 21, 2015, which is incorporated herein by reference in its entirety.

FIELD OF INVENTION

The embodiments of the present invention are generally directed to electronic devices, and more particularly, to electronic devices that produce haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

With the development of recent high resolution mobile devices such as smart phones and tablets, users are now able to view high definition audio and video on a handheld device that traditionally could only be seen in movie theaters, television or home theater systems. With haptically enabled mobile devices, experience has shown that content viewing is sufficiently enhanced, and viewers like it, if there is a haptic content component in addition to the audio and video content components. However, in order to be compatible with the high definition audio/video, corresponding high definition or high bandwidth haptic effects should also be generated.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, systems and methods include instructions for driving a haptic device including receiving a haptic drive signal configured to drive the haptic output device, identifying a resonance frequency range of the haptic output device, and attenuating the haptic drive signal corresponding to the identified resonant frequency.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 1 is a block diagram of a haptically-enabled system/device according to an example embodiment of the invention.

FIGS. 2A-2D illustrate frequency responses of an actuator according to example embodiments of the invention.

DETAILED DESCRIPTION

Figure 3:
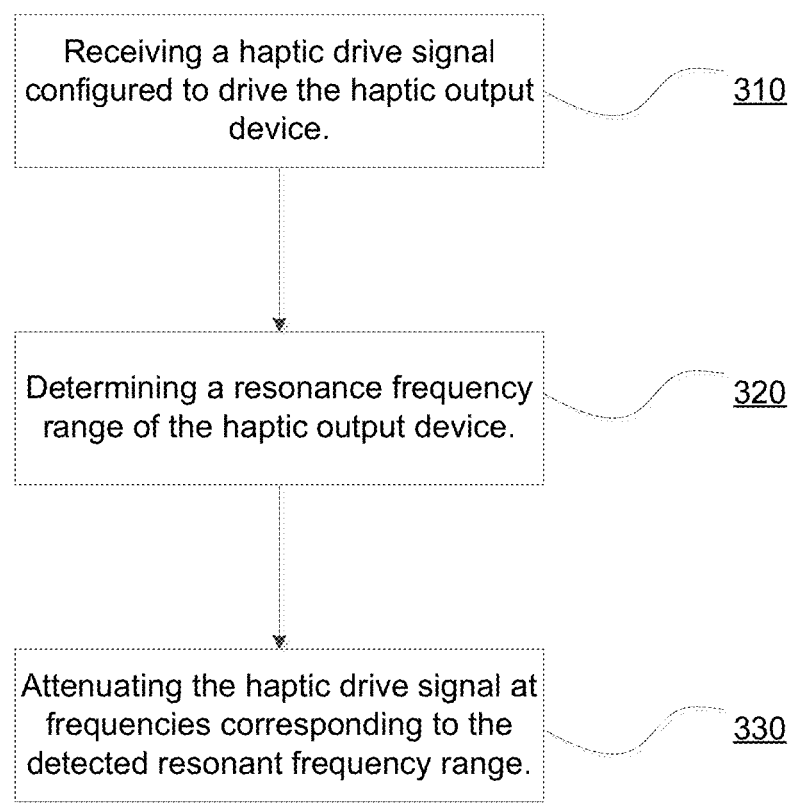
FIG. 3 illustrates a method for attenuating a drive signal and acceleration response of an actuator according to an example embodiment of the invention.

Reference will now be made in detail to embodiments, examples of which are illustrated by the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The example embodiments are generally directed toward an improved haptic driver, especially an improved high definition ("HD") haptic driver. In each of the various embodiments, the haptic driver is configured to attenuate a drive signal of an actuator. In particular, the haptic drivers described herein are configured to determine or otherwise identify the resonance frequency of the actuator and to attenuate the haptic drive signal within a range of frequencies. The range of frequencies corresponds to the resonance frequency. As a result, the strength of haptic effects produced by the actuator may be more uniform along a wider frequency range.

FIG. 1 is a block diagram of a haptically-enabled system/device 10 according to an embodiment of the present invention. System 10 includes a touch sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and a haptic drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 30, 31 or other types of haptic effects on system 10.

Processor 12 outputs the control signals to haptic drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12.

Haptic drive circuit 16 is configured to attenuate the haptic drive signal at and around the resonance frequency (e.g. +/−20 Hz, 30 Hz, 40 Hz, etc.) of actuator 16. By attenuating the range of frequencies near the resonance frequency, the haptic strength becomes more uniform over a wider frequency band. In certain embodiments, haptic drive circuit 16 may comprise a variety of signal processing stages, each stage defining a subset of the signal processing stages applied to attenuate the haptic drive signal.

Non-transitory memory 20 may include a variety of computer-readable media that may be accessed by processor 12. In the various embodiments, memory 20 and other memory devices described herein may include a volatile and nonvolatile medium, removable and non-removable medium. For example, memory 20 may include any combination of random access memory ("RAM"), dynamic RAM ("DRAM"), static RAM ("SRAM"), read only memory ("ROM"), flash memory, cache memory, and/or any other type of non-transitory computer-readable medium. Memory 20 stores instructions executed by processor 12. Among the instructions, memory 20 includes audio haptic simulation module 22, which are instructions that, when executed by processor 12, generates high bandwidth haptic effects using speaker 28 and actuator 18, as disclosed in more detail below. Memory 20 may also be located internal to processor 12, or any combination of internal and external memory.

System 10 may be any type of handheld/mobile device, such as a cellular telephone, personal digital assistant ("PDA"), smartphone, computer tablet, gaming console, remote control, or any other type of device that includes a haptic effect system that includes one or more actuators. System 10 may be a wearable device such as wrist bands, headbands, eyeglasses, rings, leg bands, arrays integrated into clothing, etc., or any other type of device that a user may wear on a body or can be held by a user and that is haptically enabled, including furniture or a vehicle steering wheel. Further, some of the elements or functionality of system 10 may be remotely located or may be implemented by another device that is in communication with the remaining elements of system 10.

Actuator 18 may be any type of actuator or haptic output device that can generate a haptic effect. In general, an actuator is an example of a haptic output device, where a haptic output device is a device configured to output haptic effects, such as vibrotactile haptic effects, electrostatic friction haptic effects, temperature variation, and/or deformation haptic effects, in response to a drive signal. Although the term actuator may be used throughout the detailed description, the embodiments of the invention may be readily applied to a variety of haptic output devices. Actuator 18 may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonance actuator ("LRA"), a solenoid resonance actuator ("SRA"), a piezoelectric actuator, a macro fiber composite ("MFC") actuator, a high bandwidth actuator, an electroactive polymer ("EAP") actuator, an electrostatic friction display, an ultrasonic vibration generator, or the like. In some instances, the actuator itself may include an haptic drive circuit.

In addition to, or in place of, actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

In general, an actuator may be characterized as a standard definition ("SD") actuator that generates vibratory haptic effects at a single frequency. Examples of an SD actuator include ERM and LRA. By contrast to an SD actuator, an HD actuator or high fidelity actuator such as a piezoelectric actuator or an EAP actuator is capable of generating high bandwidth/definition haptic effects at multiple frequencies. HD actuators are characterized by their ability to produce wide bandwidth tactile effects with variable amplitude and with a fast response to transient drive signals.

Actuators, especially HD actuators, are very responsive at their resonance frequencies. For example, HD actuators provide significantly higher haptic strength at their resonance frequencies. Such actuators, when driven at the rated voltage, produce a high amount of force. As a result, the actuators may hit internal portions of the housing of their host device. For example, the actuator may hit end stops located within the housing, and a loud and annoying noise may be produced as a result. For some actuator types, which are configured to carry a load or mass (e.g., a piezoelectric actuator), even larger forces may be produced resulting in even louder noises.

One method to solve this problem is to drive the actuator below its rated voltage. The significant drawback of this approach is a diminished haptic experience because the actuator produces less acceleration at all frequencies. In addition, there is a high degree of variance between similarly rated actuators. As a result, the similarly rated actuators often produce inconsistent haptic responses. The variance is especially large between different actuator manufacturers, but is still significant among actuators produced by a single manufacturer. Known solutions attempt to simulate and modify haptic drive signal strength externally, such as applying a software algorithm before sending the data. However, such techniques are overly complex and do not produce consistent haptic responses. By contrast, embodiments of the invention are directed to an internal solution at the integrated circuit level of the haptic driver (e.g., haptic driver circuit 16).

Each of FIGS. 2A-2D illustrates frequency responses of an actuator according to an example embodiment of the invention. As discussed above, the embodiments improve the frequency response of the actuators. Using the haptic drivers described herein, the haptic drive signals are attenuated at and around the resonance frequency of the actuator. Accordingly, the actuator is driven at a more level acceleration over a wider frequency band. In other words, the resulting haptic strength of the actuator is more uniform over a wider frequency band. Moreover, by attenuating the haptic drive signals at and around the resonance frequency, the example embodiments may reduce the mechanical energy of the actuators more quickly (i.e., braking) and greater fidelity haptic effects may be provided. As a result, the embodiments provide an improved haptic experience.

For reference, FIG. 2A illustrates the frequency response of an actuator when the haptic drive signal $V_0$ is constant (i.e., not attenuated). As shown in FIG. 2A, the haptic drive signal $V_0$ is a constant input voltage that is applied to the actuator. In this example, the acceleration of the actuator peaks at the resonance frequency which is located within a mid-range frequency band. By contrast, and as shown in FIG. 2B, the haptic drive signal $V_0$ is attenuated at a frequency band at and around the resonance frequency or resonance frequency range of the haptic output device. As a result, the acceleration of the actuator of FIG. 2B is also band attenuated. In another example, and as shown in FIG. 2C, the haptic drive signal is boosted to $V_1$ (i.e., $V_1 > V_0$), and the haptic drive signal $V_1$ is band attenuated. Signal boosting may be achieved internal or by increasing the supply or drive voltage setting. Although boosted, the acceleration of the actuator of FIG. 2C is also band attenuated at and around the resonant frequency.

Each of FIGS. 2B and 2C illustrates the use of a notch filter to attenuate the drive signal at and around the resonance frequency of the actuator. As a result, the acceleration of the actuator is also dampened at the resonance frequencies. Both the bandwidth and attenuation (e.g., depth) of the notch filter may be adjustable (e.g., programmable) so that a variety of actuators and other haptic output devices originating from different manufactures may be used. For example, the depth of attenuation may vary between 30% and 70% of the drive voltage. In addition, the width of the attenuation notch may be varied. For example, the drive signal may be attenuated within +/−20 Hz, 30 Hz, 40 Hz, etc. of the resonance frequency. This further enables the use of a larger variety of actuators and other haptic output devices. FIG. 2D illustrates the frequency responses of FIGS. 2A-2C within a single graph.

Although the use of a notch filter is described in connection with the examples of FIGS. 2B-2C, the embodiments are not so limited. In the various embodiments, a band pass filter design with a programmable parameter for frequency band and an attenuation factor may be used. In other configurations, the resonance frequency may be detected automatically, and an attenuation factor may be applied based on a predetermined or programmatically variable parameter. For example, the programmatically variable parameter may be based on a predetermined value or a programmatically controlled frequency band. In yet another configuration, an attenuation curve may be based on a characteristic curve of the actuator that is either entered manually or thru an automatic calibration or programming process.

FIG. 3 illustrates functionality 300 for attenuating a drive signal and acceleration response of an actuator according to an example embodiment of the invention. In some instances, the functionality of the flow diagram of FIG. 3 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 300 may receive one or more haptic drive signals configured to drive the actuator, at 310. Next, at 320, functionality 300 determines or identifies the resonance frequency or the resonance frequency range of the actuator. The resonance frequencies may be determined using a variety of techniques. For example, the resonance frequencies may be automatically determined by monitoring the operation of the actuator. Alternatively, the resonance frequencies may be supplied by the actuator or may be determined by using a look-up table. In yet another example, the resonance frequencies may be determined using one or more back electromotive force ("back-EMF") algorithms. Lastly, the received haptic drive signal is attenuated at frequencies corresponding to the detected resonant frequencies, at 330. One or more filters may be applied to attenuate the haptic drive signal at resonant frequencies. In some instances, the haptic drive signal voltage may also be boosted.

Embodiments of the invention are directed to haptic drivers, especially HD haptic drivers (e.g., haptic drive circuit 16 of FIG. 1). Haptic drivers may be implemented in a variety of configurations as will be described in connection with each of FIGS. 4-8. Each of the various configurations provides uniform or near uniform control of the haptic actuators originating from different manufacturers. In addition, each configuration renders a more consistent haptic experience over wider frequency ranges.

Figure 4:
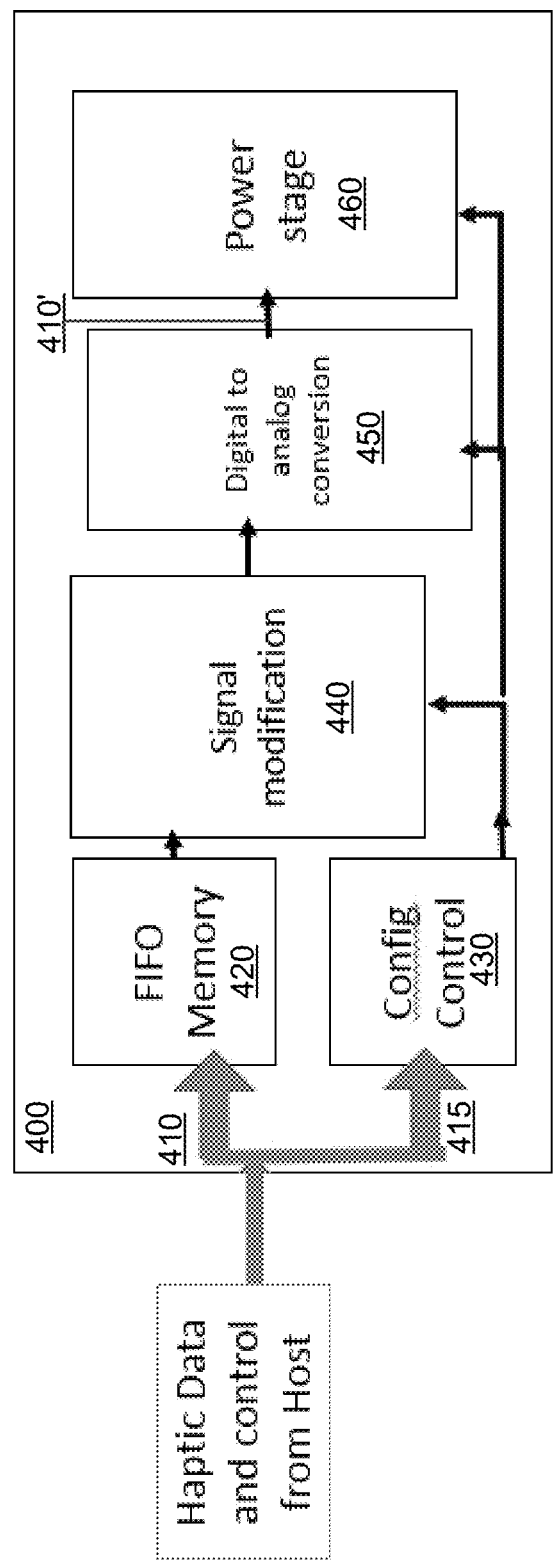
FIG. 4 illustrates a haptic driver for manipulating a haptic data signal according to an example embodiment of the present invention.

FIG. 4 illustrates a haptic driver 400 for manipulating a haptic data signal according to an example embodiment of the invention. In the example implementation shown in FIG. 4, the haptic data signal 410 is modified in digital form, with an algorithm, before converting the haptic data signal 410 to analog form when it is applied to an actuator.

As shown in FIG. 4, digital haptic data signal 410 is supplied to memory 420 (e.g., first-in-first-out memory, hereinafter "FIFO") and haptic control data 415 is supplied to configuration controller 430. Memory 420 supplies digital haptic data signal 410 to signal modifier 440. Using haptic control data 415 that is supplied by configuration controller 430, signal modifier 440 may alter digital haptic data signal 410 in advance of conversion to a corresponding analog signal. Signal modifier 440 may apply one or more processing algorithms. Such algorithms may be applied to digital haptic data signal 410 in advance of subsequent stages. In the various embodiments, haptic control data 415 may include resonance frequency data, resonance bandwidth data, and attenuation data that may be used to modify the drive voltage and attenuation parameters of digital haptic data signal 410.

In the next stage, digital haptic data signal 410 is supplied to digital to analog converter ("DAC") 450. Supplied with haptic control data 415 by configuration controller 430, DAC 450 converts the digital haptic data signal to analog haptic data signal 410'. Here, haptic control data 415 may be used to further adjust the drive voltage and attenuation parameters of digital haptic data signal 410 during the digital to analog conversion stage.

Subsequently, at power stage 460, analog haptic data signal 410' is received and its voltage level may be varied depending on the input parameters of subsequent stages. For example, power stage 460 may be configured to adjust the voltage level of analog haptic data signal 410' using one or more output filters.

Figure 5:
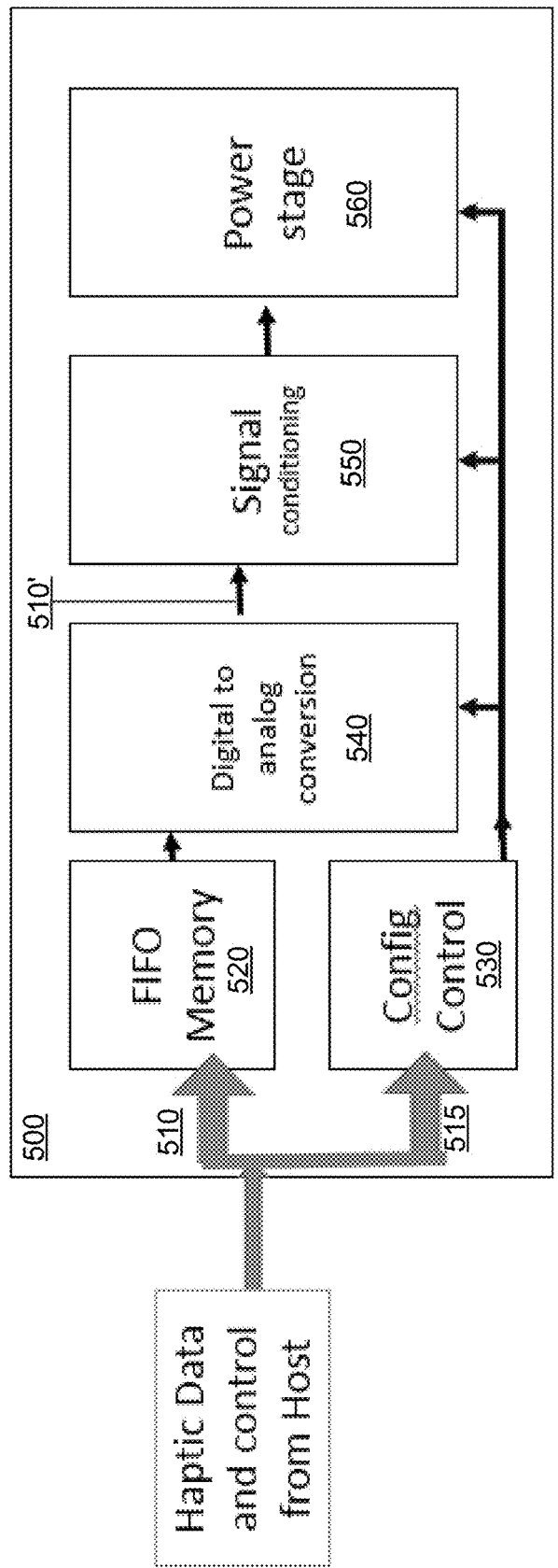
FIG. 5 illustrates a haptic driver for manipulating a haptic data signal according to another example embodiment of the invention.

FIG. 5 illustrates a haptic driver 500 for manipulating a haptic data signal according to another example embodiment of the invention. In the example implementation shown in FIG. 5, the haptic data signal 510 is converted to analog form before signal condition processing occurs.

As shown in FIG. 5, digital haptic data signal 510 is supplied to memory 520 (e.g., FIFO memory) and haptic control data 515 is supplied to configuration controller 530. Memory 520 supplies digital haptic data signal 510 to DAC 540. Supplied with haptic control data 515 by configuration controller 530, DAC 540 converts the digital haptic data signal to analog haptic data signal 510'. Haptic control data 515 may include resonance frequency data, resonance bandwidth data, and attenuation data that may be used to modify the drive voltage and attenuation parameters of digital haptic data signal 510 during the digital to analog conversion stage.

In the next stage, analog haptic data signal 510' is supplied to signal conditioner 550. Using haptic control data 515 that is supplied by configuration controller 530, signal conditioner 550 may alter analog haptic data signal 510' using one or more analog filtering algorithms that utilize haptic control data 515. For example, a variety of analog filters, such as an RC filter, may be used. More complex filters may be implemented in semiconductor device depending on the design. In some instances, signal conditioner 550 may further be applied to enhance the characteristics of silicon used to fabricate the actuator located at a subsequent stage. In the various embodiments, haptic control data 515 may be used to modify the drive voltage and attenuation parameters of analog haptic data signal 510'.

Subsequently, at power stage 560, analog haptic data signal 510' is received and its voltage level may be varied depending on the input parameters of subsequent stages. For example, power stage 560 may be configured to adjust the voltage level of analog haptic data signal 510' using one or more output filters.

Figure 6:
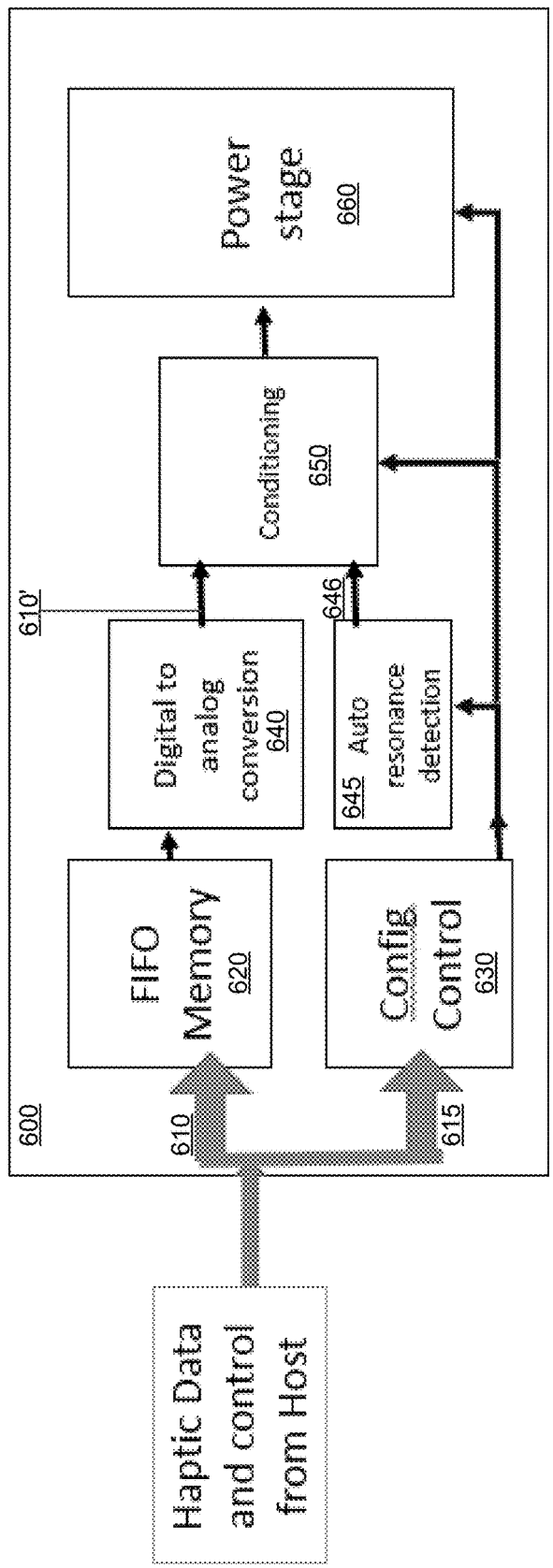
FIG. 6 illustrates a haptic driver for manipulating a haptic data signal according to another example embodiment of the invention.

FIG. 6 illustrates a haptic driver 600 for manipulating a haptic data signal according to another example embodiment of the invention. In this example implementation as shown in FIG. 6, the haptic data signal 610 is converted to analog form before further signal condition processing occurs.

As shown in FIG. 6, digital haptic data signal 610 is supplied to memory 620 (e.g., FIFO memory) and haptic control data 615 is supplied to configuration controller 630. Memory 620 supplies digital haptic data signal 610 to DAC 640. DAC 650 converts the digital haptic data signal to analog haptic data signal 610'.

In this example embodiment, haptic control data 615 is supplied to resonance detector 645. Using the resonance detector 645, haptic driver 600 may readily determine the resonance frequency of a down stage actuator. For example, resonance detector 645 may be configured to scan and/or otherwise automatically determine the resonance frequency of the actuator. In some instances, the resonance frequency band and corresponding attenuation may be adjusted. In another example, resonance detector 645 may be configured to detect changes in resonance frequency using a sensing mechanism (e.g., located at the haptic device) to measure force or applied pressure. In yet another example, the actuator itself may supply its resonance frequency. In yet another example, back-EMF may be used to determine the resonance frequency of the actuator. Use of back-EMF to determine one or more characteristics of the actuator is described, for example, in U.S. Pat. No. 7,843,277, which is hereby incorporated by reference. Haptic control data 615 may be supplied to resonance detector 645. Resonance detector 645 may be an auto resonance detector adapted to use configuration parameters supplied by haptic control data 615 and configuration controller 630. To reduce time of resonance detection for an individual actuator, configuration parameters (e.g., frequency of resonance from data sheet) may be provided as a starting point. Additional configuration parameters, such as back-EMF gain may be provided to prevent false detection.

In the next stage, analog haptic data signal 610', resonance detection signal 646, and haptic control data 615 are supplied to signal conditioner 650. Using these inputs, signal conditioner 650 may alter analog haptic data signal 610'. In the various embodiments, haptic control data 615 may include resonance frequency data, resonance bandwidth data, and attenuation data that may be used to modify the drive voltage and attenuation parameters of digital haptic data signal haptic data signal 610'.

Subsequently, at power stage 660, analog haptic data signal 610' is received and its voltage level may be varied depending on the input parameters of subsequent stages. For example, power stage 660 may be configured to adjust the voltage level of analog haptic data signal 610' using one or more output filters.

Figure 7:
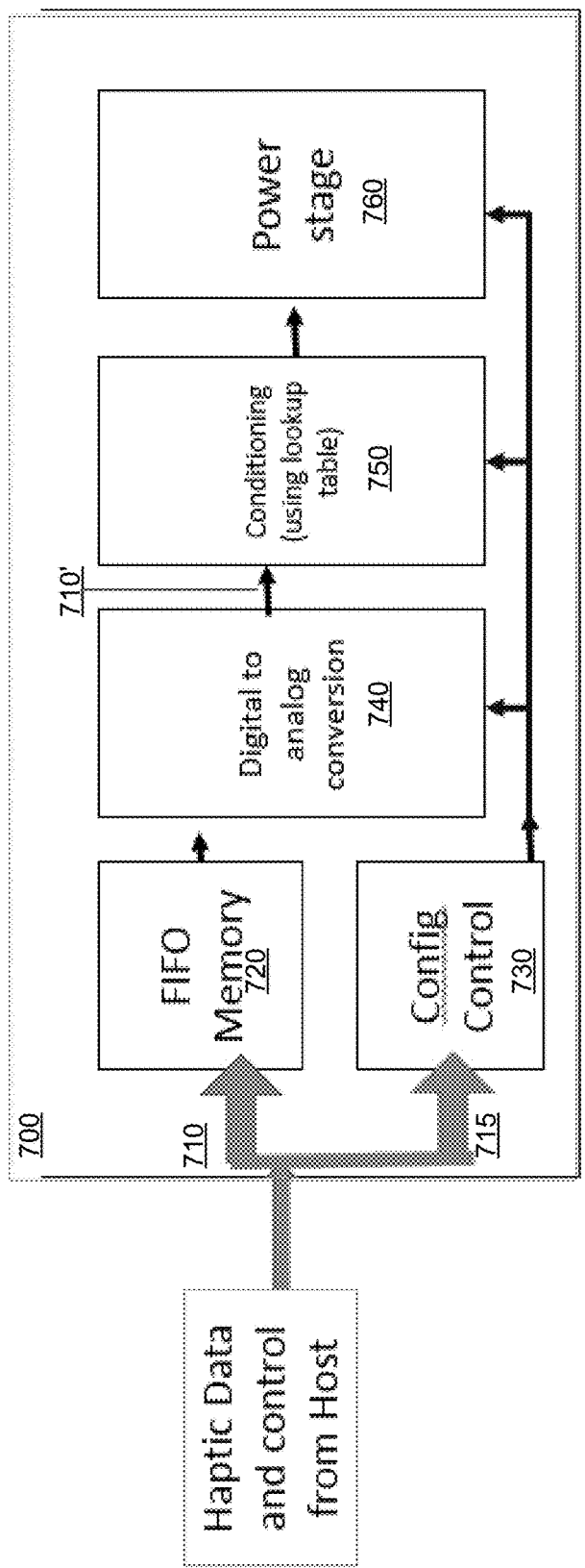
FIG. 7 illustrates a haptic driver for manipulating a haptic data signal according to another example embodiment of the invention.

FIG. 7 illustrates a haptic driver 700 for manipulating a haptic data signal according to another example embodiment of the present invention. In the example implementation shown in FIG. 7, haptic data signal 710 is converted to analog form before further signal condition processing occurs.

As shown in FIG. 7, digital haptic data signal 710 is supplied to memory 720 (e.g., FIFO memory) and haptic control data 715 is supplied to configuration controller 730. Memory 720 supplies digital haptic data signal 710 to DAC 740. Supplied with haptic control data 715 by configuration controller 730, DAC 750 converts digital haptic data signal 710 to analog haptic data signal 710'. Haptic control data 715 may include resonance frequency data, resonance bandwidth data, and attenuation data that may be used to modify the drive voltage and attenuation parameters of digital haptic data signal 710 during the digital to analog conversion stage.

In the next stage, analog haptic data signal 710' is supplied to signal conditioner 750. In this embodiment, signal conditioner 750 uses a lookup table (not shown). The lookup table may be supplied by the user or be preprogrammed. For example, the look-up table may store the frequency response characteristics for multiple actuators made by a variety of manufacturers. Using the lookup table and haptic control data 715 that is supplied by configuration controller 730, signal conditioner 750 may alter analog haptic data signal 710'. In the various embodiments, haptic control data 715 may be used to modify the drive voltage and attenuation parameters of analog haptic data signal 710'.

Subsequently, at power stage 760, analog haptic data signal 710' is received and its voltage level may be varied depending on the input parameters of subsequent stages. For example, power stage 760 may be configured to adjust the voltage level of analog haptic data signal 710' using one or more output filters.

Figure 8:
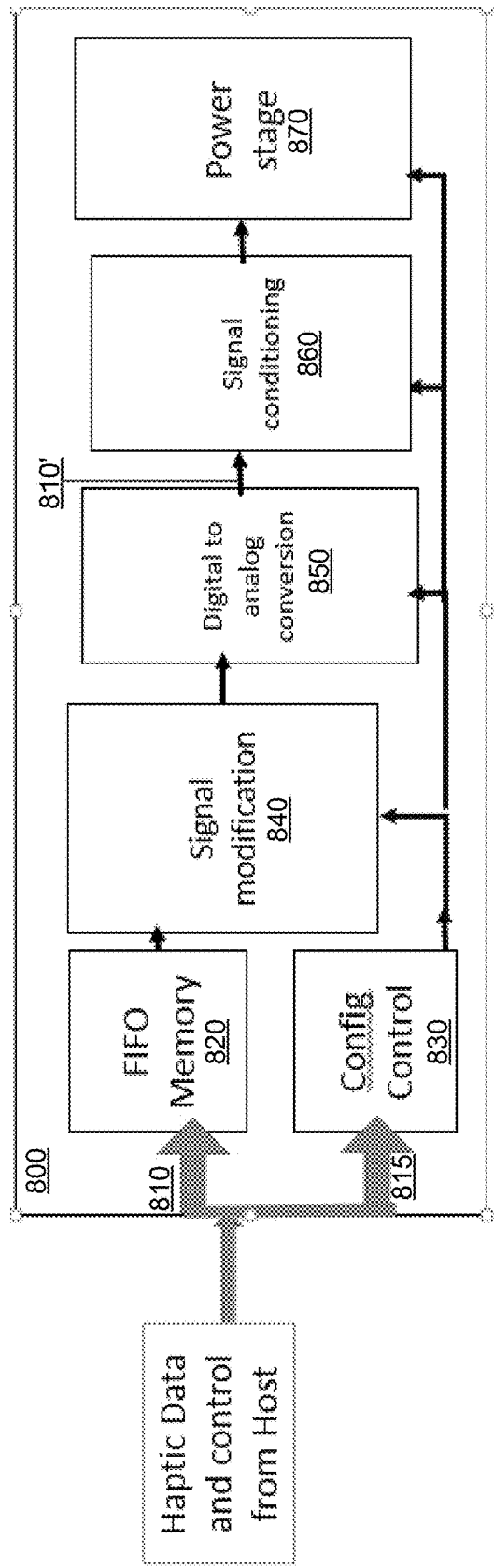
FIG. 8 illustrates a haptic driver for manipulating a haptic data signal according to yet another example embodiment of the invention.

FIG. 8 illustrates a haptic driver 800 for manipulating a haptic data signal according to yet another example embodiment of the invention. In the example implementation shown in FIG. 8, haptic driver 800 processes haptic data signal 810 using signal modification and signal conditioning.

As shown in FIG. 8, digital haptic data signal 810 is supplied to memory 820 (e.g., FIFO) and haptic control data 815 is supplied to configuration controller 830. Memory 820 supplies digital haptic data signal 810 to signal modifier 840. Using haptic control data 815 that is supplied by configuration controller 830, signal modifier 840 may alter digital haptic data signal 810 in advance of conversion to a corresponding analog haptic data signal 810'. Signal modifier 840 may apply one or more processing algorithms. Such algorithms may be applied to digital haptic data signal 810 in advance of subsequent stages. In the various embodiments, haptic control data 815 may include resonance frequency data, resonance bandwidth data, and attenuation data that may be used to modify the drive voltage and attenuation parameters of digital haptic data signal 810.

Subsequently, the digital haptic data signal 810 is supplied to DAC 840. Supplied with haptic control data 815 by configuration controller 830, DAC 850 converts the digital haptic data signal 810 to analog haptic data signal 810'. Haptic control data 815 may be used to modify the drive voltage and attenuation parameters of digital haptic data signal 810 during the digital to analog conversion stage.

In the next stage, analog haptic data signal 810' is supplied to signal conditioner 860. Using analog haptic data signal 810' and haptic control data 815, signal conditioner 860 may alter analog haptic data signal 810'. As discussed above, signal conditioner may apply signal conditioning based on a programmed parameter, a resonance detection mechanism, a look-up table, and the like.

Lastly, at power stage 870, analog haptic data signal 810' is received and its voltage level may be varied depending on the input parameters of subsequent stages. For example, power stage 870 may be configured to adjust the voltage level of analog haptic data signal 810' using one or more output filters.

Figure 9:
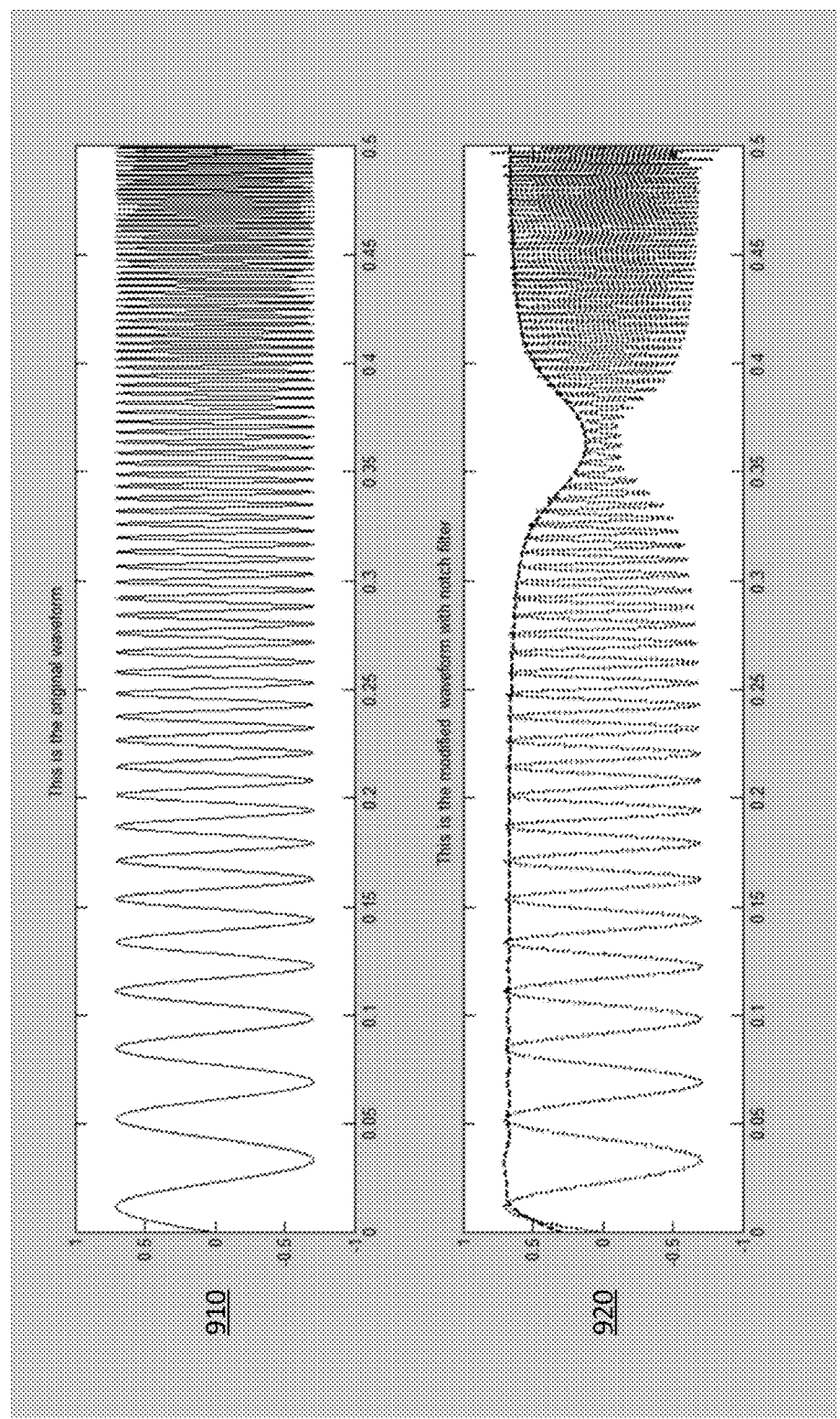
FIG. 9 illustrates the effect of a notch filter according to an example embodiment of the present invention.

FIG. 9 illustrates the effect of a notch filter according to an example embodiment of the invention. As shown in FIG. 9, haptic drive signal 910 is defined as a variable frequency signal within the 20-450 Hz range. With application of the notch filter (not shown), as haptic drive signal 910 reaches notch filter frequencies, its signal strength is attenuated as shown by the resulting haptic drive signal 920. Various characteristics of the filter, such as filter gain, determine the degree of attenuation caused by the notch filter.

As discussed above, the embodiments of the invention provide significant improvement and uniformity in haptic experience over a wider frequency band. Moreover, the overall frequency response of the haptic actuators is improved. The HD haptic drivers described herein provide uniform control of haptic actuators made by different manufacturers and help to render consistent haptic experience over wider frequency ranges by improving the haptic response of the actuators to make it usable for wider frequency band and provide uniform/consistent experience.

Several embodiments have been specifically illustrated and/or described. However, it will be appreciated that modifications and variations of the disclosed embodiments are covered by the above teachings and within the purview of the appended claims without departing from the spirit and intended scope of the invention. The embodiments described herein are only some of the many possible implementations. It should be noted that some of the blocks can be combined to optimize silicon/IC usage. Furthermore, the embodiments may be readily applied to various actuator types and other haptic output devices.

I claim:

1. A method for driving a haptic output device, the method comprising:
   receiving a haptic drive signal configured to drive the haptic output device;
   identifying a resonance frequency range of the haptic output device; and
   attenuating, according to a characteristic curve of the haptic output device, the haptic drive signal at frequencies corresponding to the resonance frequency range.

2. The method for driving a haptic output device according to claim 1, wherein the haptic drive signal is attenuated to level corresponding strengths of haptic effects produced by the haptic output device.

3. The method for driving the haptic output device according to claim 1, wherein the resonance frequency range is automatically determined by monitoring operation of the haptic output device.

4. The method for driving the haptic output device according to claim 1, wherein the resonance frequency range is determined by using a look-up table.

5. The method for driving the haptic output device according to claim 3, wherein the resonance frequency range is automatically determined using back-EMF.

6. The method for driving the haptic output device according to claim 1, wherein the haptic drive signal is attenuated using a notch filter.

7. The method for driving the haptic output device according to claim 1, wherein the haptic output device is a high definition haptic output device that are configured to produce wide bandwidth haptic effects.

8. The method for driving the haptic output device according to claim 1, wherein the haptic drive signal is further attenuated to reduce a mechanical energy state of the haptic output device.

9. A device comprising:
   a processor; and
   a memory storing one or more programs for execution by the processor, the one or more programs including instructions for:
   receiving a haptic drive signal configured to drive a haptic output device;
   identifying a resonance frequency range of the haptic output device; and
   attenuating, according to a characteristic curve of the haptic output device, the haptic drive signal at frequencies corresponding to the resonance frequency range.

10. The device according to claim 9, wherein the haptic drive signal is attenuated to level corresponding strengths of haptic effects produced by the haptic output device.

11. The device according to claim 9, wherein the resonance frequency range is automatically determined by monitoring operation of the haptic output device.

12. The device according to claim 9, wherein the resonance frequency range is supplied by the haptic output device or is determined by using a look-up table.

13. The device according to claim 11, wherein the resonance frequency range is automatically determined using back-EMF.

14. The device according to claim 9, wherein the haptic drive signal is attenuated using a notch filter.

15. The device according to claim 9, wherein the haptic output device is a high definition haptic output device that is configured to produce wide bandwidth haptic effects.

16. A non-transitory computer readable storage medium storing one or more programs configured to be executed by a processor, the one or more programs comprising instructions for:
   receiving a haptic drive signal configured to drive a haptic output device;
   identifying a resonance frequency range of the haptic output device; and attenuating, according to a characteristic curve of the haptic output device, the haptic drive signal at frequencies corresponding to the resonance frequency range.

17. The non-transitory computer readable storage medium according to claim 16, wherein the haptic drive signal is attenuated to level corresponding strengths of haptic effects produced by the haptic output device.

18. The non-transitory computer readable storage medium according to claim 16, wherein the resonance frequency range is automatically determined by monitoring operation of the haptic output device.

19. The non-transitory computer readable storage medium according to claim 16, wherein the resonance frequency range is supplied by the haptic output device or is determined by using a look-up table.

20. The non-transitory computer readable storage medium according to claim 18, wherein the resonance frequency range is automatically determined using back-EMF.

21. The method for driving a haptic output device according to claim 1, wherein the characteristic curve of the haptic output device is determined according to an automatic calibration process or an automatic programming process.

22. The method for driving the haptic output device according to claim 1, wherein the haptic output device is a high definition haptic output device that is an electroactive polymer actuator or a piezoelectric actuator.

23. The method for driving the haptic output device according to claim 1, wherein the resonance frequency range is supplied by the haptic output device.

24. The method for driving the haptic output device according to claim 1, wherein the characteristic curve defines the frequency response of the haptic output device.

* * * * *